US012797872B2

(12) United States Patent
Shook et al.

(10) Patent No.: US 12,797,872 B2
(45) Date of Patent: Nov. 17, 2026

(54) CORROSION RESISTANT NOZZLE AND LID FOR AN ADIABATIC GAS COOLER

(71) Applicant: CG THERMAL, LLC, Twinsburg, OH (US)

(72) Inventors: James Richard Shook, Ellicottville, NY (US); Ethan Schrader, Cleveland, OH (US)

(73) Assignee: CG THERMAL, LLC, Twinsburg, OH (US)

( * ) Notice: Subject to any disclaimer, the term of this patent is extended or adjusted under 35 U.S.C. 154(b) by 163 days.

(21) Appl. No.: 18/909,223

(22) Filed: Oct. 8, 2024

(65) Prior Publication Data

US 2026/0097409 A1 Apr. 9, 2026

(51) Int. Cl.
*B05B 1/26* (2006.01)
*B01D 5/00* (2006.01)
*B05B 1/02* (2006.01)

(52) U.S. Cl.
CPC ............ *B05B 1/267* (2013.01); *B01D 5/0027* (2013.01); *B01D 5/0084* (2013.01); *B05B 1/02* (2013.01)

(58) Field of Classification Search
CPC ......... B05B 1/267; B05B 1/02; B05D 5/0027; B05D 5/0084
USPC ................................ 239/461, 518, 500, 501
See application file for complete search history.

(56) References Cited

U.S. PATENT DOCUMENTS 4,514,291 A * 4/1985 McGarry ............. B03D 1/1475 239/501
5,240,183 A * 8/1993 Bedaw .................. B05B 7/0466 239/501
5,384,051 A 1/1995 McGinness
10,866,023 B2 12/2020 Park et al.
11,058,984 B2 7/2021 Jung et al.
11,143,468 B2 10/2021 Najafifard
11,287,165 B2 3/2022 Bittner
11,830,636 B2 11/2023 Babayants et al.
2004/0035953 A1* 2/2004 Nelson .................... B05B 1/262 239/501
2013/0000869 A1 1/2013 Daum et al.

FOREIGN PATENT DOCUMENTS

CN 100351598 C 11/2007
CN 113912012 A 1/2022
KR 20060080997 A 7/2006

OTHER PUBLICATIONS

Extended European Search Report from corresponding Application No. 25207484.4 mailed on Feb. 2, 2026, 7 pages.

* cited by examiner

*Primary Examiner* — Steven J Ganey
(74) *Attorney, Agent, or Firm* — Tucker Ellis LLP

(57) ABSTRACT

A nozzle assembly is mountable in a passage of a lid of a gas cooler. Heated gas containing acidic or acid-forming constituents flows into the gas cooler through the nozzle assembly. The nozzle assembly includes a liner having an upper end and a lower end, and the liner is made from material that is corrosion resistant to a condensate of the heated gas. The nozzle assembly also includes a deflector upstream of the liner that reduces a cross-sectional area of the passage to increase a concentration of the acidic or acid-forming constituents at the liner so that, under cooling of the heated gas as the heated gas passes the liner, the heated gas condenses adjacent the liner in a band between the upper and lower ends

28 Claims, 8 Drawing Sheets

CORROSION RESISTANT NOZZLE AND LID FOR AN ADIABATIC GAS COOLER

TECHNICAL FIELD

The technology of the present disclosure relates generally to gas coolers for hot process gas streams in industrial settings, and more particularly, to a nozzle and a lid for an adiabatic gas cooler within a hot gas stream having a corrosion resistant configuration.

BACKGROUND

Adiabatic gas coolers for hot process gas streams are common in industrial applications. Many industrial processes have hot gas streams that are also corrosive in nature due to acidic constituents. Reliability and life cycle challenges are a problem in the industrial adiabatic cooling of hot, corrosive gas streams. Adiabatic cooling involves the introduction of water into the gas stream, to cool the process gas to sub-dew point temperatures. Condensation of acidic gas at critical acid dew points creates highly corrosive conditions on contact surfaces of the gas cooler, such as a lid of the cooler through which the gas stream is introduced. This will destroy the material surrounding the flow.

In an example, conventional lids have an opening for the gas stream to enter the cooler. In some coolers, the opening is lined with a high nickel alloy. The lining of this type of lid, for most sulfuric acid process streams, will need to be replaced every two to three years. In this sense, the lining is considered sacrificial by many in the industry. Replacing portions of the lid that have become corroded tends to be time consuming. In some instances the replacement process can take months. This leads to downtime of the system in which the cooler is used.

SUMMARY

To improve an industrial adiabatic cooler's ability to withstand highly corrosive conditions imposed by hot acidic or acid-forming gasses during cooling to sub-dew point temperatures, there is a need for an assembly that has higher corrosion resistance with adequate temperature handling capability. Disclosed is an improved nozzle assembly for a lid of a gas cooler. The nozzle assembly has flow features to control a location at which gasses are condensed and a liner adjacent the condensation location that is made from corrosion resistant material.

In one embodiment, a nozzle assembly is mountable in a passage of a lid of a gas cooler. Heated gas containing acidic or acid-forming constituents flows into the gas cooler through the nozzle assembly. The nozzle assembly includes a liner having an upper end and a lower end, and the liner is made from material that is corrosion resistant to a condensate of the heated gas. The nozzle assembly also includes a deflector upstream of the liner that reduces a cross-sectional area of the passage to increase a concentration of the acidic or acid-forming constituents at the liner so that, under cooling of the heated gas as the gas passes the liner, the heated gas condenses adjacent the liner in a band between the upper and lower ends

DETAILED DESCRIPTION

Figure 1:
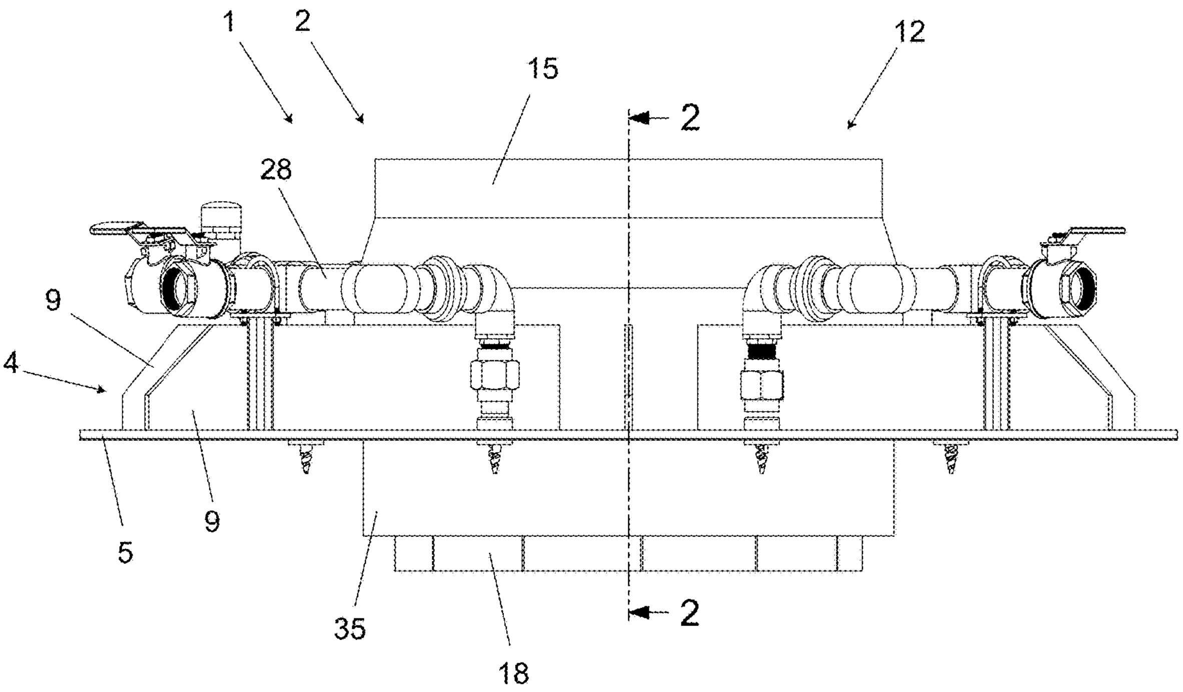
FIG. 1 side view of a lid assembly for an adiabatic gas cooler according to aspects of the present disclosure.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Figure 2:
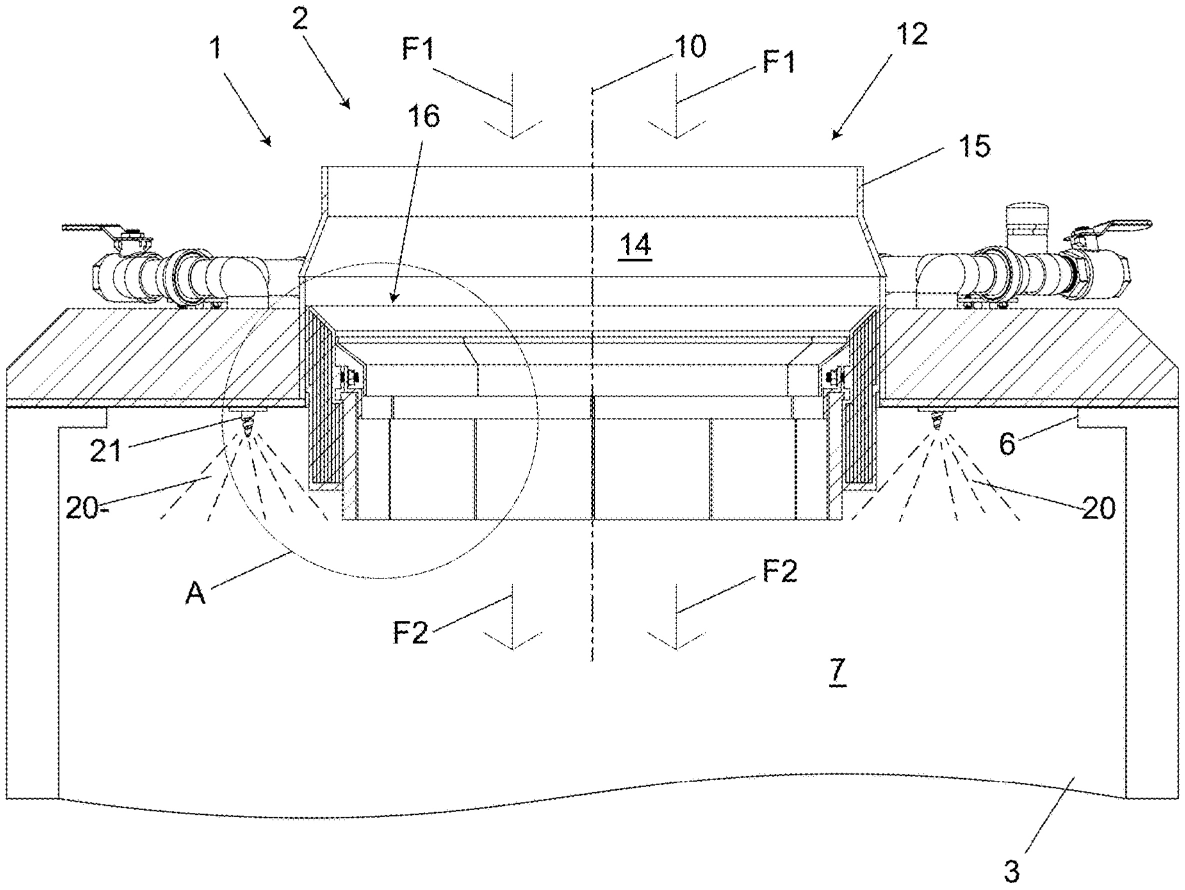
FIG. 2 is a cross-sectional view of the lid assembly taken along the line 2-2 in FIG. 1.
Figure 3:
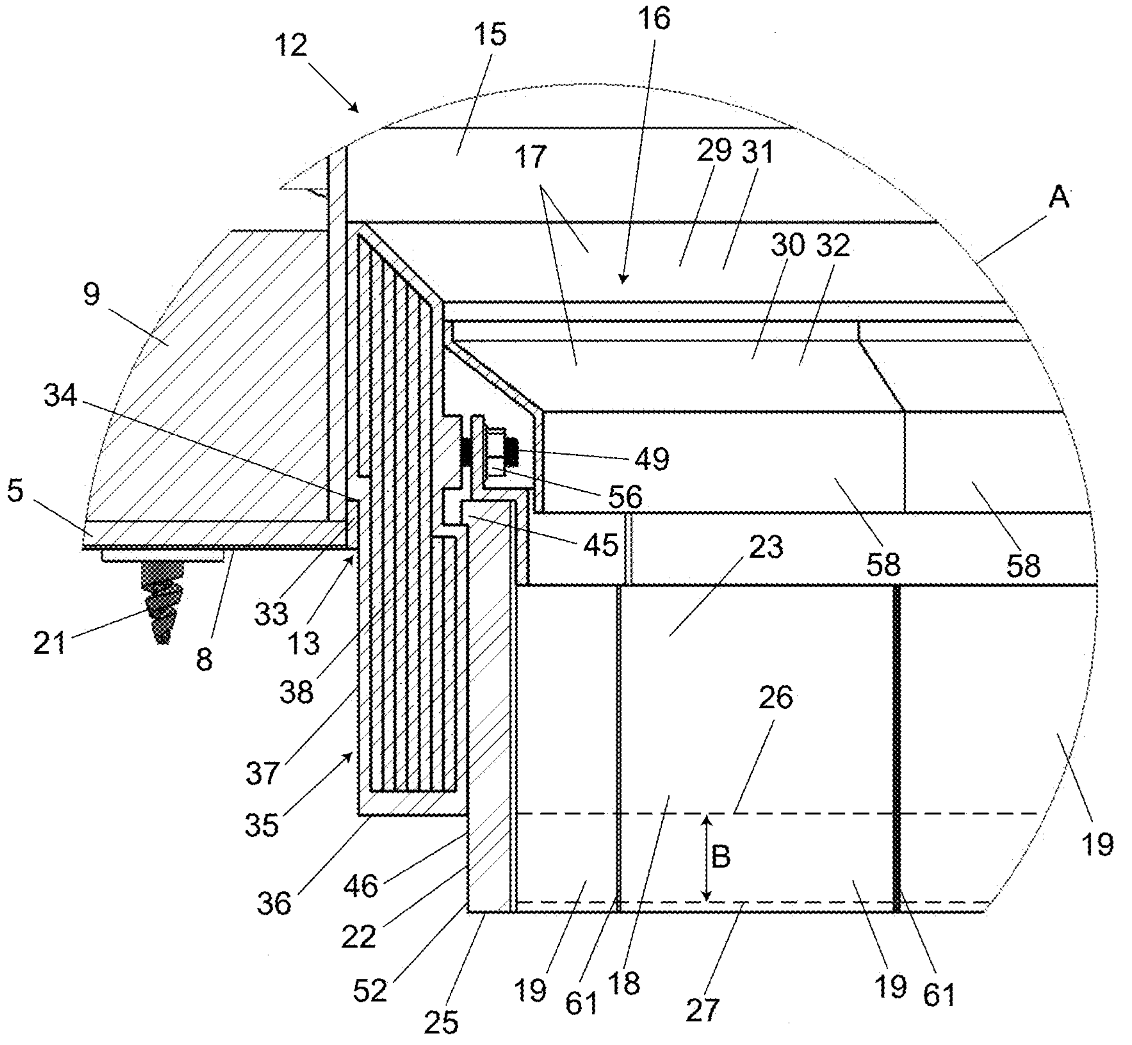
FIG. 3 is an enlargement of detail A from FIG. 2.

With initial reference to FIGS. 1-3, illustrated is a lid assembly 1 for an adiabatic gas cooler 2 (also referred to in the industry as a hot scrubber). The lid assembly 1 may be bolted, clamped or otherwise fastened to a process vessel 3 (also referred to in the industry as a hot scrubber tower) of the adiabatic gas cooler 2. The process vessel 3 is partially and schematically shown in FIG. 2. The process vessel 3 is omitted from FIG. 1 for clarity of illustration. The lid assembly 1 and the process vessel 3 form the major components of the adiabatic gas cooler 2. It will be understood that the adiabatic gas cooler 2 may include other components that are not shown or discussed.

The adiabatic gas cooler 2 of the present disclosure is configured and engineered for cooling hot gases, which may be corrosive in nature. For instance, the adiabatic gas cooler 2 may be used to cool and condense gases that form a sulfur oxide based acid, examples of which are sulfurous acid and sulfuric acid. For instance, when combined with water, gas containing sulfur dioxide (SO2) forms sulfurous acid (H2SO3) and gas containing sulfur trioxide (SO3) forms sulfuric acid (H2SO4). It also will be understood that the lid assembly 1, or components thereof, may be used in other operational contexts, such as coolers for other types of gases or for other types of industrial process equipment that do not necessarily cool gases.

The lid assembly 1 may include a lid 4 that structurally supports other components of the lid assembly 1. In one embodiment, the lid 4 includes a lid plate 5 that forms a top wall of the adiabatic gas cooler 2. The lid plate 5 is secured to an open, upper end 6 of the process vessel 3 with bolts, screws, welding, clamps, brackets, or other fastening elements. The lid plate 5 has an upper surface and a lower surface and the lower surface is exposed to an interior chamber 7 of the process vessel 3. The lid plate 5 may be made from metal, such as stainless steel (e.g., 316 stainless steel in one embodiment) or a metal alloy (e.g., a Hastelloy). In one embodiment, the lower surface of the lid plate 5 may be lined with a lining 8 (FIG. 3) that is interposed between the interior chamber 7 and the lid plate 5. The lining 8 may be made from a material that is more corrosive resistant than the lid plate 5. For instance, the lining may be made from nickel alloy (e.g., a Hastelloy), ceramic material, glass, graphite, refractory material, silicon carbide, etc. The lining 8 may reduce corrosion of the lid plate 5 in the event of up-flow of the gas processed by the cooler 2 or a condensate of the gas.

For added strength and rigidity of the lid 4, ribs 9 may be secured to the upper surface of the lid plate 5. In the illustrated embodiment, the ribs 9 have major surfaces that are perpendicular to the upper surface of the lid plate 5. Also in the illustrated embodiment, the ribs 9 extend in a radial direction from a longitudinal axis 10 of the lid assembly 1. The ribs 9 may have other arrangements. The ribs 9 may be omitted depending on the thickness and strength of the lid plate 5. The ribs 9 may be made from the same material as the lid plate 5 and may be attached to the lid plate 4 by welding, bolts, screws, brackets, or other fastening elements.

The lid assembly 1 also may include a nozzle assembly 12 that is mounted in a lid passage 13 of the lid 4. The lid passage 13 is formed by a through opening in the lid 4. The components of the nozzle assembly 12 form a nozzle passage 14 through which the gas flows into the cooler 2. The nozzle assembly 12, as will be described in greater detail, controls a flow of the gas into the cooler 2. The components of the nozzle assembly 12 are arranged so that the shape of the nozzle passage 14 in cross-section relative to the longitudinal axis 10 is circular, but other shapes are possible. The flow of the gas as it enters the nozzle passage 14 is indicated by arrows F1 in FIG. 2 and a condensate of the gas as it exits the nozzle and enters the process vessel 3 is indicated by arrows F2 in FIG. 2.

The nozzle assembly 12 includes a fitting 15 that couples to the lid 4, such as at the opening that forms the lid passage 13. In one embodiment, the fitting 15 is welded to the lid plate 5 at a bottom edge of the fitting 15 and/or to the ribs 9 along an exterior side surface of the fitting 15. The fitting 15 fluidically couples the nozzle assembly 12 to a pipe (not shown) through which the gas flows toward the cooler 2 from other equipment in an industrial process system. An upstream end of the fitting 15 is sized to connect to the pipe and a downstream end of the fitting 15 is sized to coordinate with the lid opening 13. In the illustrated embodiment, the fitting 15 has a taper so that the cross-sectional area increases in the direction of the gas flow. In other embodiments, the fitting 15 may reduce in size or have a constant size in the direction of the gas flow. It is preferable that the fitting 15 not increase the pressure of the gas so that the gas does not condense before a target condensation band in the nozzle. The target condensation band will be described in greater detail below. In one embodiment, the fitting 15 makes fluid tight connections with the pipe and with the lid 4.

A fluid is introduced into the passage 14 of the nozzle assembly through the fitting 15. The fluid may be heated gas. The heated gas may contain acidic constituent or an acid-forming constituent. For example, the heated gas may be or may contain an acidic component (e.g., sulfurous acid or sulfuric acid) or a component that forms an acid (also referred to as an "acid-forming gas" or an "acid-forming compound" or an "acid-forming constituent") when reacted with another compound, such as water (H2O). Examples of acid-forming compounds include, but are not limited to, sulfur dioxide and sulfur trioxide.

Following introduction in the passage 14, the gas interacts with a deflector 16. The deflector 16, as will be described in greater detail, is configured in conjunction with cooling aspects of the cooler 2 to condense the gas in a target condensation band B. For this purpose, the deflector 16 has an inclined portion 17 that has an inclined angle relative to the longitudinal axis 10 of the nozzle assembly 12. This reduces the cross-sectional area of the nozzle passage 14 in the direction of travel of the gas, which will increase the upstream static pressure of the gas and increase velocity of the gas. The inclined angle and a longitudinal length of the inclined portion 17, and a corresponding amount of cross-sectional reduction of the nozzle passage 14 introduced by the inclined portion 17, is predetermined to achieve a desired effect on the flow of the gas (e.g., the inclined angle will achieve a gas velocity in a predetermined velocity range). It is further contemplated that the inclined portion 17 will make the flow of gas downstream of the inclined portion 17 more uniform in cross-section relative to the longitudinal axis 10 than upstream of the inclined portion 17. More specifically, downstream of the deflector 16 and at least adjacent the liner 18, a concentration of the acidic or acid-forming constituents of the gas will be more uniform than a concentration of the acidic or acid-forming constituents of the gas upstream of the deflector 16. Also, the reduced cross sectional area of the passage 14 caused by the deflector 16 increases a concentration of the acidic or acid-forming constituents in the heated gas as the heated gas flows through the passage 14. These effects on the flow of the gas prepare the gas for condensing in the target condensation band B.

Downstream of the deflector 16 is a liner 18. The liner 18 is made from a material that is non-reactive with the gas, the constituents of the gas, or a condensate of the gas. The condensate of the gas may include a compound formed from the gas or one or more of constituents of the gas by reaction with another compound, such as another constituent of the gas or a constituent of a cooling fluid that is introduced into the process vessel 3. The liner 18 is heat tolerant to temperatures at least as hot as the gas. Exemplary corrosion resistant materials are ceramics, glass, graphite, refractory material, and silicon carbide (SiC). In most embodiments, the liner 18 will be non-metallic, but metals or metal alloys are also possible. A liner 18 made from or including silicon carbide may be desirable in some embodiments since silicon carbide is corrosion and temperature resistant, and may be manufactured by molding. In one embodiment, the liner is made from alpha silicon carbide (α-SiC). In one embodiment, the liner 18 may be made from plurality of liner panels 19 that combine to encircle the flow of the gas through the passage 14.

A cooling fluid 20 is introduced into the interior chamber 7 of the process vessel 3. The cooling fluid 20 adiabatically cools the heated gas that flows through the passage 14. The cooling fluid 20 may be, for example, liquid water. In the illustrated embodiment, the cooling fluid 20 is introduced through the lid panel 5 at multiple points that are radially outward of the liner 18 relative to the nozzle passage 14. In one embodiment, the cooling fluid 20 is introduced by way of nozzles 21 used to spray the cooling fluid 20. The nozzles 21 may be helical nozzles that introduced the cooling fluid 20 in centerless cones. The position of the nozzles 21 and direction of the cooling fluid 20 introduction may allow the cooling fluid 20 to be sprayed on a radial outward side 22 of the liner 18. In other embodiments, the position of the nozzles 21 and direction of the cooling fluid 20 introduction may be configured to avoid having the cooling fluid 20 contact the radial outward side 22 of the liner 18.

The temperature drop introduced by the cooling fluid 20 (including possible mixing of the cooling fluid 20 with the gas), together controlling the gas flow in terms of one or more of pressure, velocity, and concentration by the deflector, cause the gas to condense in the target condensation band B adjacent a radial inward side 23 of the liner 18. The temperature of the gas may drop within the target condensation band B by about 300° F. to about 600° F., and more typically by about 400° F. to about 500° F. In some systems, for example, the temperature may fall from about 800° F. to about 300° F. in the target condensation band B. The band B has a length along the longitudinal axis 10. As will be appreciated, the inclined angle and a size of the deflector 16 are selected to increase a velocity of the heated gas and/or are selected to decrease a pressure of the heated gas that, combined with cooling of the gas by the cooling fluid 20, causes the gas to condense in the band B.

As illustrated, the liner 18 has an upper end 24 at the upstream side of the liner 18 and a lower end 25 at the downstream side of the liner 18. The target condensation band B is between the upper end 24 and the lower end 25 of the liner 18. Thus, in one embodiment, the target condensation band B completely overlaps with the liner 18 along the direction of the longitudinal axis 10. In one embodiment, a upper edge 26 of the target condensation band B at the upstream side of the target condensation band B is at or below a midpoint between the upper end 24. In another embodiment, the upper edge 26 of the target condensation band B is in the lower third of the liner 18. In another embodiment, the upper edge 26 of the target condensation band B is in the lower quarter of the liner 18. In another embodiment, the upper edge 26 of the target condensation band B is in a lower twenty percent of the liner 18. In one embodiment, a lower edge 27 of the target condensation band B at the downstream side of the target condensation band B is at an elevation of the lower end 25 of the liner 18 (e.g., the lower edge 27 has the same elevation as the lower end 25). In one embodiment, the lower edge 27 of the target condensation band B is in the lower five percent of the liner 18. In another embodiment, the lower edge 27 of the target condensation band B is in the lower ten percent of the liner 18. In another embodiment, the lower edge 27 of the target condensation band B is in the lower twenty percent of the liner 18. In still another embodiment, the lower edge 27 of the target condensation band B is longitudinally below the lower end 25 of the liner 18.

In the case where the gas or the condensate of the gas contains a corrosive constituent (e.g., sulfurous acid and/or sulfuric acid), the location at which the gas condenses is where the gas or condensate thereof is the most corrosive. Upstream of this location, the gas is too hot and is not yet mixed with water from the cooling fluid 20 to result in a detrimental amount of corrosion of the components of the nozzle assembly 12. As described, the liner 18 is corrosive resistant to the gas or a condensate thereof. Since the location at which the gas condenses is adjacent the liner 18, it is contemplated that very little corrosion to any of the parts of the nozzle assembly 12 or the lid assembly 1 will occur. Therefore, the nozzle assembly 12 and the lid assembly 1 are predicted to have a much longer life-cycle than conventional lid assemblies. In some cases, depending on the industrial process, the nozzle assembly 12 and lid assembly 1 need not be replaced at all, with possible exception of the liner 18.

The cooling fluid 20 may be supplied to the nozzles 21 through a network of pipes 28 that are attached to the lid 4. Various pumps, valves, flow regulators, filters, couplers, fittings, and/or other plumbing components may be present to control the supply of the cooling fluid 20.

Additional aspects of the nozzle assembly will be described, primarily with reference to FIG. 3. In the illustrated embodiment, the deflector 16 has a stepped arrangement. In this embodiment, the deflector 16 has a first, or upper, deflector portion 29 and a second, or lower, deflector portion 30. The upper deflector portion 29 has an inclined portion 31 that has an inclined angle relative to the longitudinal axis 10 of the nozzle assembly 12. This reduces the cross-sectional area of the nozzle passage 14 in the direction of travel of the gas, which will increase the upstream static pressure of the gas and increase velocity of the gas. The inclined angle and a longitudinal length of the inclined portion 31, and a corresponding amount of cross-sectional reduction of the nozzle passage 14 introduced by the inclined portion 31, is predetermined to achieve a desired effect on the flow of the gas (e.g., the inclined angle will achieve a gas velocity in a predetermined velocity range).

Similarly, the lower deflector portion 30 has an inclined portion 32 that has an inclined angle relative to the longitudinal axis 10 of the nozzle assembly 12. This reduces the cross-sectional area of the nozzle passage 14 in the direction of travel of the gas, which will increase the upstream static pressure of the gas and increase velocity of the gas. The inclined angle and a longitudinal length of the inclined portion 32, and a corresponding amount of cross-sectional reduction of the nozzle passage 14 introduced by the inclined portion 32, is predetermined to achieve a desired effect on the flow of the gas (e.g., the inclined angle will achieve a gas velocity in a predetermined velocity range).

The inclined portions 31 and 32 of the upper deflector portion 29 and the lower deflector portion 30, respectively, combined to achieve the target condensation band B for the gas that has the characteristics described above in connection with the description of the deflector 16. The inclined angle of the inclined portion 31 may be the same or may be different than the inclined angle of the inclined portion 32. In one embodiment, the inclined angle of the inclined portion 31 of the upper deflector 29 is a range from about 30 degrees to about 60 degrees. In one embodiment, the inclined angle of the inclined portion 32 of the lower deflector 30 is a range from about 30 degrees to about 60 degrees.

Other nozzle-like configurations may be used instead of the illustrated and described deflector 16 or portions 29, 30. For instance, rather than an inclined angle that forms a frustoconical arrangement for the deflector 16 or portions 29, 30, the profile of the deflector 16 or portions 29, 30 may be curved or may have multiple facets. Also, other flow control components may be added to the nozzle assembly 12.

To assist in retaining components of the nozzle assembly 12, a supporting ring 33 may be secured to one or more of the lid 4 or the fitting 15. For instance, in the illustrated embodiment, the supporting ring 33 is attached to the inner perimeter of the opening in the lid plate 5 that forms the lid passage 13 and is attached to the inner surface of the fitting 15 at a lower end thereof. The attachment may be made by welding, bolts, screws, or other appropriate technique. The supporting ring 33 need not be continuous around the entirety of the lid passage 13. The supporting ring 33 forms a shoulder 34 that supports one or more other components of the nozzle assembly 12. The supporting ring 33 may be made from a metal or metal alloy, such as nickel alloy (e.g., a Hastelloy).

The nozzle assembly 12 of the illustrated embodiment, includes an insulation assembly 35. The insulation assembly 35 keeps at least portions of the liner 18 from being cooled by the cooling fluid 20 such that the gas does not condense above the target condensation band B. In one embodiment, a lower end 36 of the insulation assembly 35 is positioned in elevation at the upper edge 26 of the target condensation band B. In another embodiment, the lower end 36 of the insulation assembly 35 is positioned in elevation above the upper edge 26 of the target condensation band B. The lower end 36 of the insulation assembly 35 is positioned so that the liner 16 is appropriately cooled by the cooling fluid 20 in the target condensation band B, which may depend on the angle of introduction of the cooling fluid 20 and the distance of introduction from the liner 16.

The insulation assembly 35 of the illustrated embodiment includes an insulation housing 37 and an insulator 38. The insulation housing 37 may be made from a metal or metal alloy, such as nickel alloy (e.g., a Hastelloy). The insulator 38 may be made from, for example, a refractory ceramic blanket having one or more layers. The insulator 38 may be completely encased in the insulation housing 37.

Figure 4:
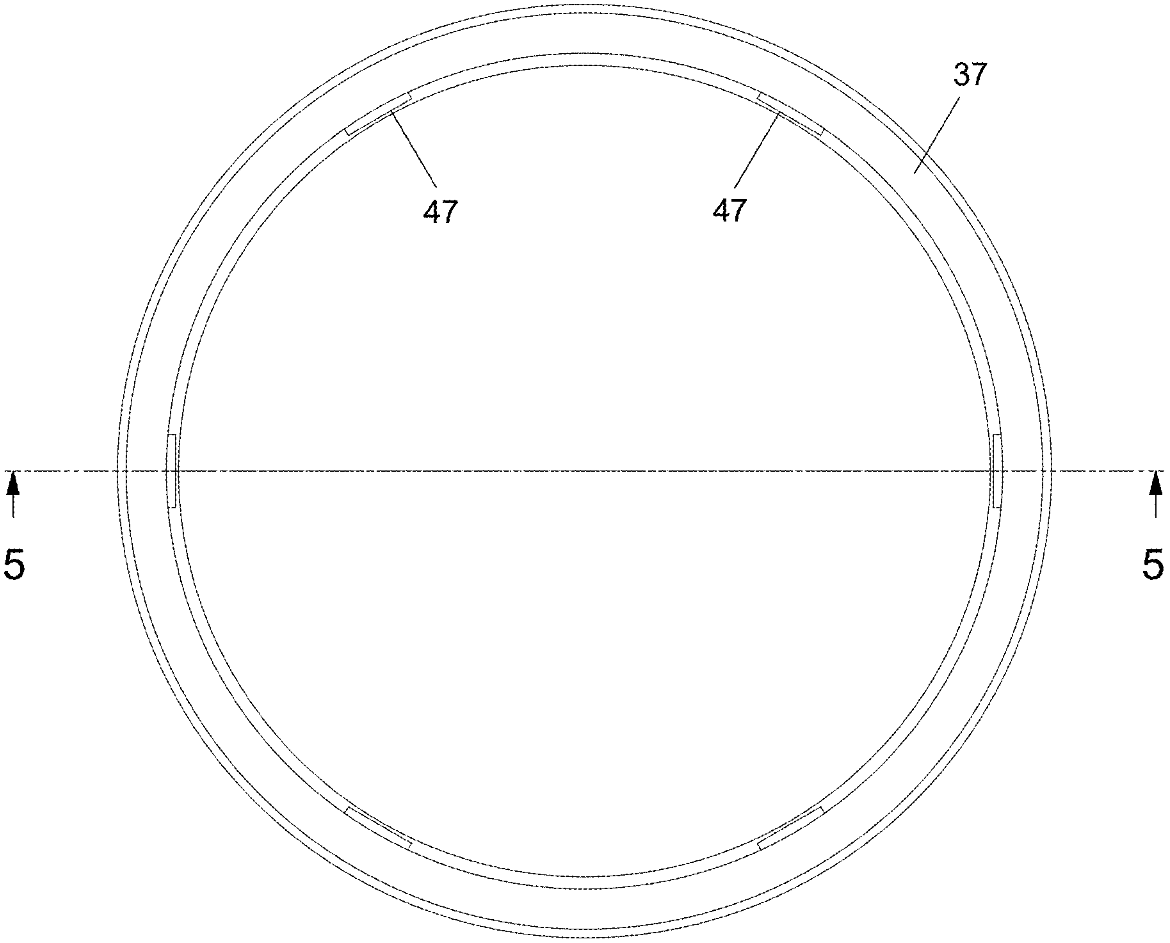
FIG. 4 is a top view of an insulator housing.
Figure 5:
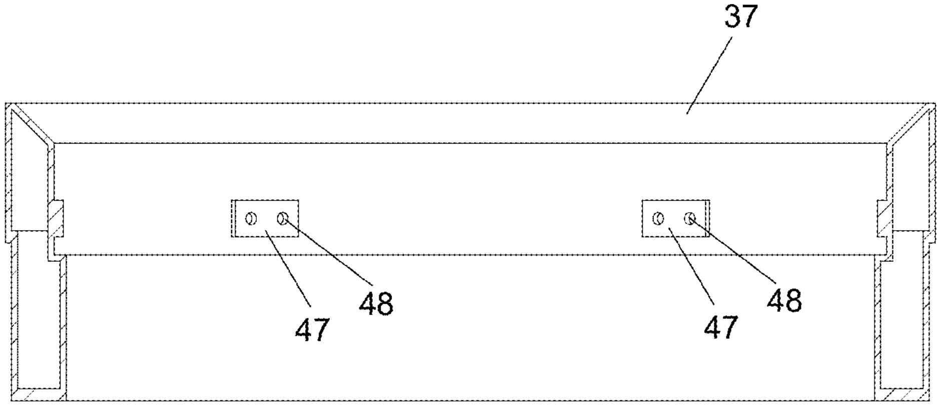
FIG. 5 is a cross-sectional view of the insulator housing taken along the line 5-5 in FIG. 4.
Figure 6:
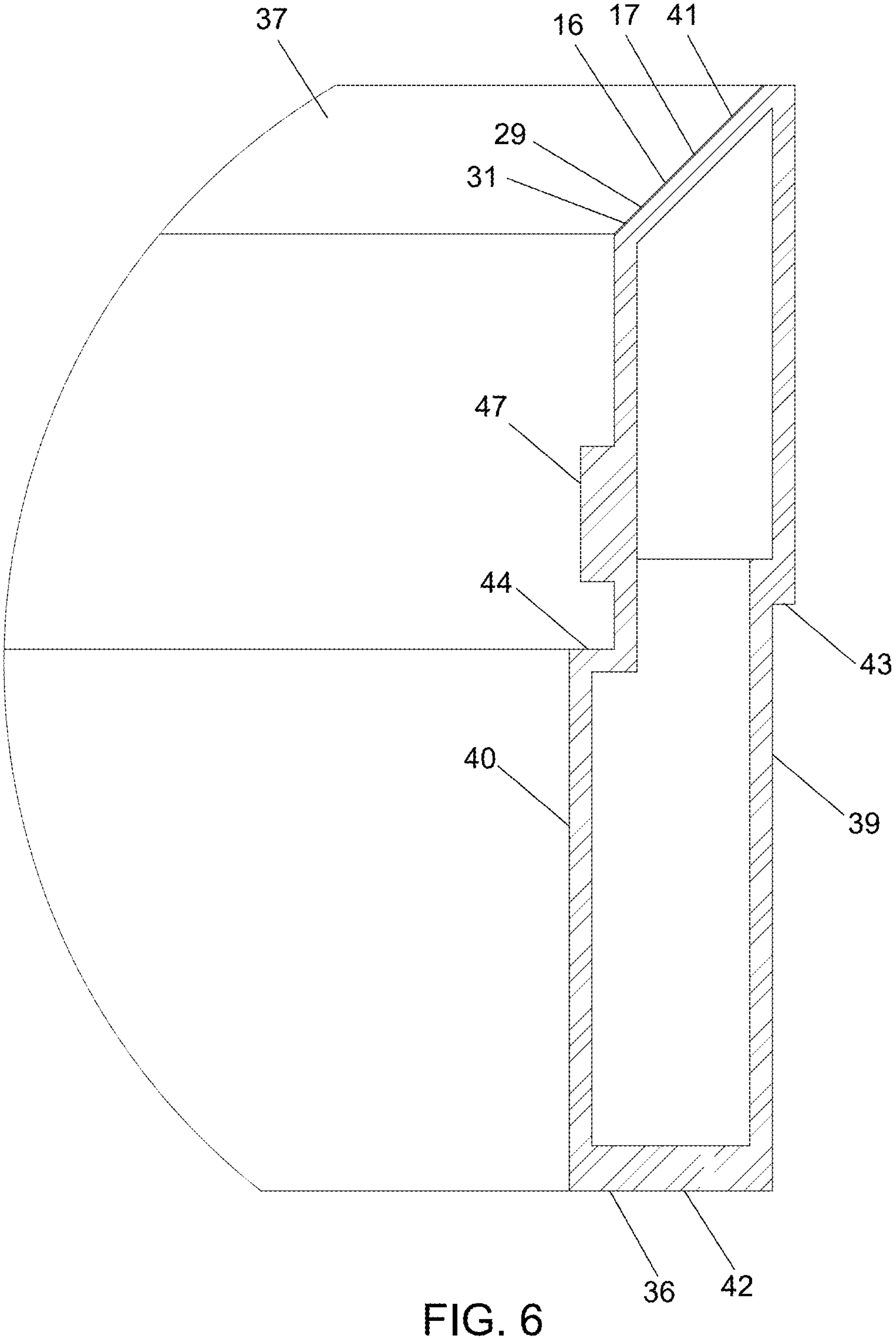
FIG. 6 is an enlargement of the right-hand portion of the cross-sectional view of the insulator housing.

With additional reference to FIGS. 4-6 additional details of the insulation housing 37 will be described. The insulation housing 37 has a radial outer wall 39, a radial inner wall 40, a top wall 41, and a bottom wall 42. In one embodiment, the top wall 41 forms all or part of the deflector 16. For instance, the top wall 41 may have an outer (upper) surface that forms at least part of the inclined surface 17. In the illustrated embodiment, the outer surface of the top wall 41 forms the inclined surface 31 of the upper deflector 29.

The radial outer wall 39 of the illustrated embodiment includes a step 43 that rests on the shoulder 34 of the supporting ring 33 so that the supporting ring 33 provides subjacent support to the insulation housing 37. The portion of the insulation housing 37 longitudinally above the step 43 contacts the inner wall of the fitting 15. In one embodiment, the insulation housing 37 is secured to the supporting ring 33 and/or the fitting 15 by welding, bolts, screws, or other fastening technique. The interface between the insulation housing 37 and the supporting ring 33 and/or the fitting 15 may be fluid tight. One or more seals may be present between the insulation housing 37 and the supporting ring 33 and/or the fitting 15.

The bottom wall 42 forms the lower end 36 of the insulation assembly 35. In the illustrated embodiment, the lower end 36 is normal to the longitudinal axis 10. In other embodiments, the lower end 36 may be inclined so that a lower end of the radial outer wall 39 is elevationally above a lower end of the radial inner wall 40. The shape, inclination, and location of the bottom wall 42 may be configured together with the nozzles 21 to effectuate desired cooling of the liner 18 at the target condensation band B by the cooling fluid 20.

The radial inner wall 40 of the illustrated embodiment is stepped to form a shoulder 44. The shoulder 44 may provide subjacent support for a step 45 located along a radial outer wall 46 of the liner 18. The radial inner wall 40 of the illustrated embodiment also includes mounting segments 47. The mounting segments 47 may be thickened portions of the radial inner wall 40. In other embodiments, the mounting segments 47 are separate from the radial inner wall 40 and are secured to the radial inner wall 40 by welding, bolts, screws, or other fastening techniques.

The mounting segments 47 of the illustrated embodiment include threaded openings 48 that are configured to accept coordinating threaded fasteners 49, such as bolts, threaded rods, or screws. In another embodiment, the mounting segments 47 are manufactured with integral lugs or posts, and the lugs or posts may be threaded to form the threaded fasteners 49. In the illustrated embodiment, the threaded fasteners 49 are threaded rods that are secured in the threaded openings 48.

Figure 7:
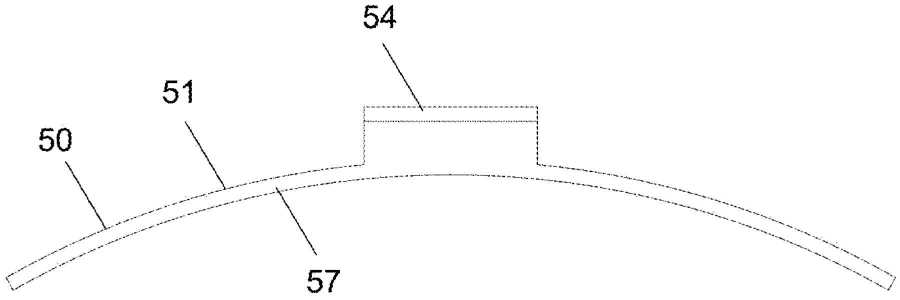
FIG. 7 is a top view of a liner bracket.
Figure 8:
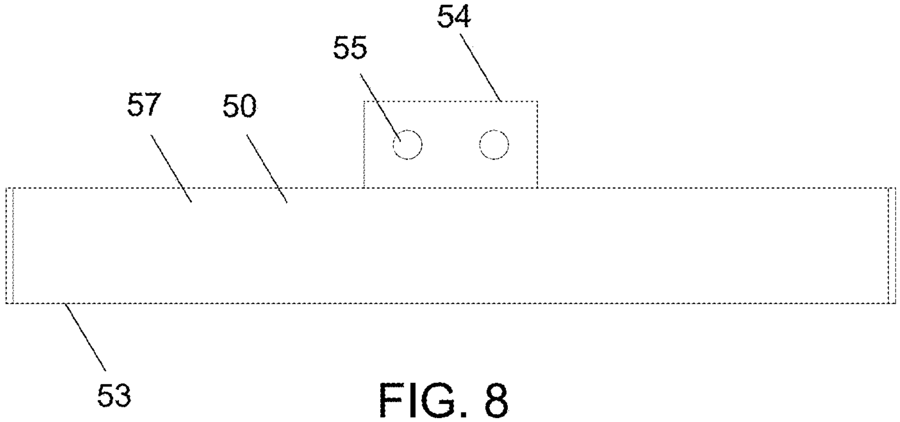
FIG. 8 is a front view of the liner bracket.
Figure 9:
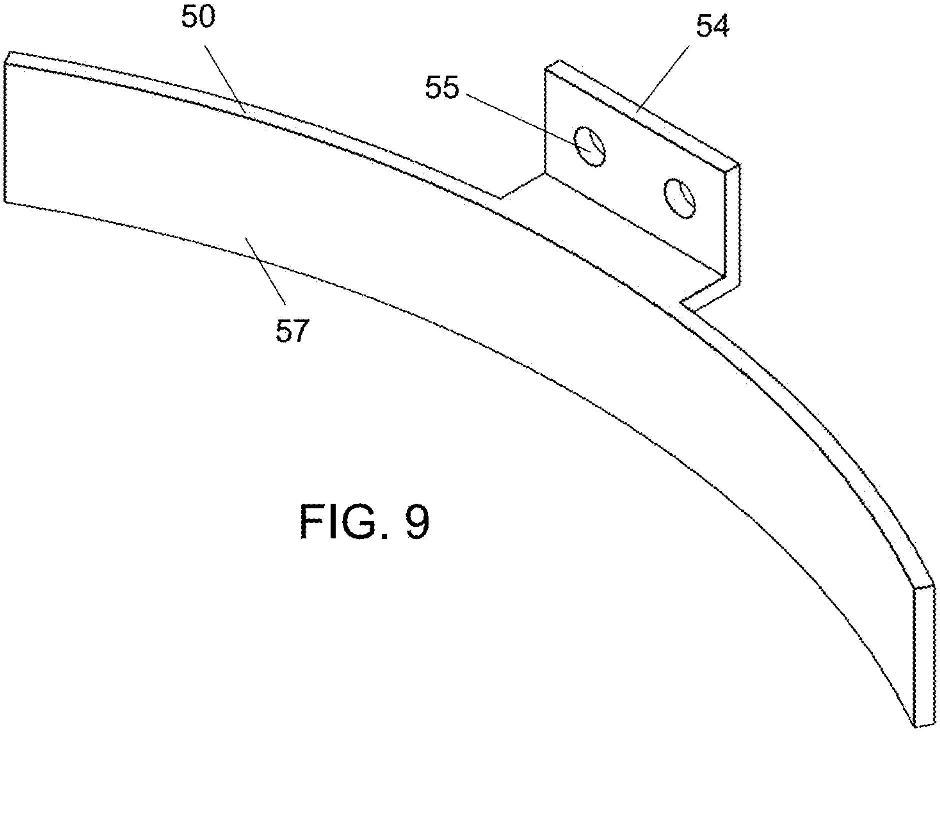
FIG. 9 is a perspective view of the liner bracket.

With additional reference to FIGS. 7-9, a liner bracket 50 may be secured to the radial inner wall 40 of the insulation housing 37. The liner bracket 50 holds the liner 18 in place. For instance, the liner bracket 50 may clamp the liner 18 between an outer radial wall 51 of the liner bracket 50 and the inner radial wall 40 of the insulation housing 37 so that the radial outer wall 46 of the liner 18 abuts a lower portion of the inner radial wall 40 of the insulation housing 37. A lower edge 53 of the liner bracket 50 ends above the target condensation band B so as to avoid contact with the most corrosive portions of the gas or condensate thereof. In one embodiment, the lower edge 53 of the liner bracket 50 ends in the upper twenty five percent of the liner 18. The liner bracket 50 may be made from metal or a metal alloy, such as nickel alloy (e.g., a Hastelloy).

The liner bracket 50 of the illustrated embodiment, has a flange 54 having holes 55 that align with the threaded fasteners 49 so that the threaded fasteners 49 traverse through the flange 55. The liner bracket 50 is then secured in place with nuts 56 that are threaded onto the threaded fasteners 49. The liner bracket 50 may be secured to the insulation housing 37 in other manners, such as with bolts, screws, welding, or other fastening technique.

The liner bracket 50 may be formed in sections. For instance, in the illustrated embodiment, the liner bracket 50 is made from six bracket sections 57 that individually attach to the insulation housing 37 and that each hold a portion of the liner 18. Gaps may be present between the bracket sections 57 or the bracket sections 57 may abut one another to form a continuous, but segmented, ring. In one embodiment, the liner 18 is held in place by the clamping force exerted on the liner 18 by the liner bracket 50 and the insulation housing 37. Springs (not illustrated) or other resilient members may be position between the liner bracket 50 and the insulation housing 37 to assist in controlling an amount of clamping force exerted by the liner bracket 50. In one embodiment, springs or other resilient members are positioned around the threaded fasteners 49. Springs or other resilient members may be alternatively or additionally positioned between the liner bracket 50 and the nuts 56. In addition to the clamping action of the liner bracket 50, the interaction of the step 45 of the liner 18 and the shoulder 44 of the insulation housing 37 may contribute to holding the liner 18 in place. In other embodiments, the liner 18 may be held in place by other techniques, such as being directly bolted or screwed to the insulation housing 37, held by friction fit into a receiving channel, etc. Also, the outside corner of the shoulder 44 and/or the inside corner of the step 45 may be radiused to avoid a stress point on the liner 18.

Figure 10:
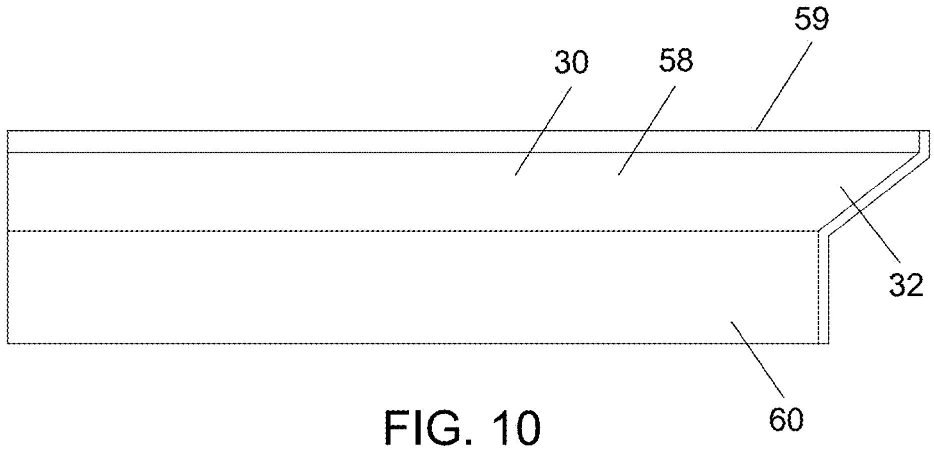
FIG. 10 is a front view of a deflector section.
Figure 11:
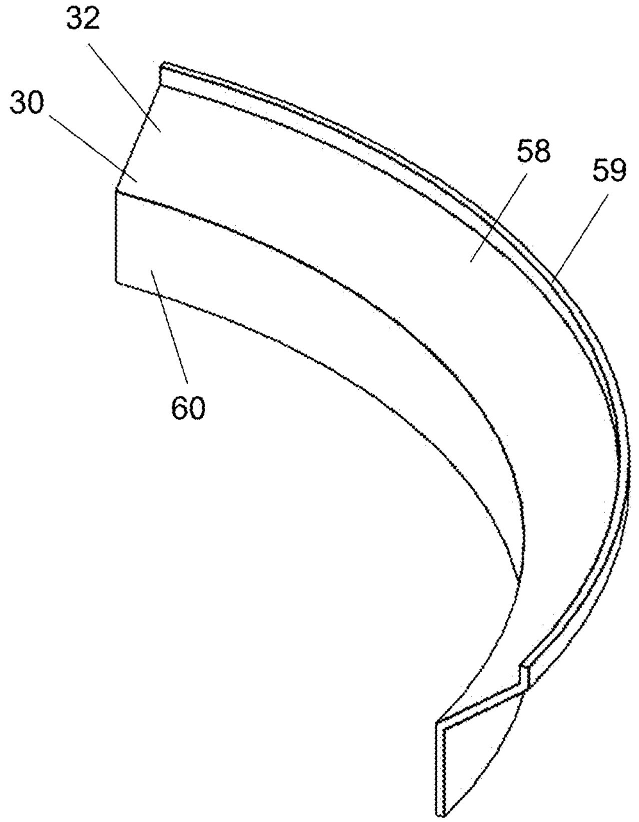
FIG. 11 is a perspective view of the deflector section.

With additional reference to FIGS. 10 and 11, a segment 58 of the lower deflector 30 is illustrated. In the illustrated embodiment, four segments 58 combine to form the lower deflector 30. Each segment 58 includes a portion of the inclined portion 32. A longitudinal wall 59 may extend upward from an upper end of the inclined portion 32. The longitudinal wall 59 may be secured to the inner radial wall 40 of the insulation housing 37. For instance, a radial inner surface of the longitudinal wall 59 may be welded, bolted, or screwed to the insulation housing 37, or another appropriate fastening technique may be used. Another longitudinal wall 60 may extend downward from a lower end of the inclined portion 32. The longitudinal wall 60 may radially cover the areas where liner bracket 50 secures to the insulation housing 37. The lower deflector 30 covers the upper end of the liner 18 and the arrangement that mounts the liner 18 to the insulation housing 37, thus separating these areas from the flow of gas. In one embodiment, the longitudinal wall 60 does not contact the liner bracket 50. The segments 58 of the lower deflector 30 may be made from metal or a metal alloy, such as nickel alloy (e.g., a Hastelloy).

As indicated, the liner 18 may be made in segments 19, also referred to as liner panels. The segments 19 combined to surround the flow of gas and condensate thereof. Although made in segments 19, the liner 18 may be continuously surround the longitudinal axis 10 of the nozzle assembly 12. For instance, the segments 19 of the liner 18 may have side edges 61 that fit tightly together following thermal expansion. In the case of a liner 18 made from silicon carbide, thermal expansion is expected to be about 0.1 inches over a 60 inch diameter liner 18 at 400° F. In one embodiment, the edges 61 join to be fluid tight (or almost fluid tight) to completely prevent or minimize the gas or condensate from travelling radially between the segments 19. In one embodiment, the edges 61 are radially straight and the edges 61 of each segment abut one another in radial planes stemming from the longitudinal axis 10.

In another embodiment, the edges 61 have coordinating features that radially overlap to reduce radial flow between the segments. Exemplary radially overlapping features include, but are not limited to, a crenelated pattern, a tongue and groove pattern, a finger joint pattern, a labyrinth pattern (or labyrinth seal), or similar pattern. In another embodiment, edges 61 from two segments 19 that are adjacent each other having locking features that mate, such as dovetails, opposing hooks, or an axial rod and hollow cylinder feature. To join the segments 19 that have edge locking features together, the top edge of one segment 19 is aligned with the bottom edge of the adjacent segment 19 and the segments 19 are slid longitudinally so that the locking features slidably engage one another and become interlocked. In addition to or instead of structurally coordinating features at the edges 61 of the segments 19, seals may be employed. In another embodiment, the liner 18 is monolithic (i.e., is made in one piece).

In some embodiment, the liner 18, or segments 19 of the liner, is easily removed from the nozzle assembly 12 to allow for maintenance, repair, or replacement of the liner 18 (or individual segments 19 of the liner 18). For instance, for the nozzle assembly 12 of illustrated embodiment, the lower deflector 30 may be removed (e.g., by cutting, grinding, or breaking a weld that secures the lower deflector 30 to the insulation housing 37). Then, one or more portions of the liner bracket 50 may be removed by unscrewing the nuts 56. At that point, the liner 18 or segments 19 of the liner 18 may be removed and maintained, repaired, or replaced as needed.

The characteristics of the nozzle assembly 12 may be adapted for the industrial process system in which the nozzle assembly 12 is employed, and for whether the nozzle assembly 12 is to be installed in a new cooler 2 or retrofitted into an existing cooler 2. One or more of the following structural characteristics, as well as other unmentioned structural characteristics, may be adjusted:

- size of the fitting 15 to mate with a gas feed pipe from the system;
- a number of steps of the deflector 16 and corresponding number of inclined portions 17, 31, 32;
- inclination angle, dimensions and surface area of each inclined portion 17, 31, 32;
- dimensions of the liner 18;
- dimensions and insulation value of the insulation assembly 35;
- location and spray pattern of the nozzles 21; and
- location and size (e.g., length in the longitudinal direction 10) of the target condensation band B relative to the liner 18.

In making the foregoing adjustments, consideration may be given to the following system characteristics, as well as other unmentioned system characteristics:

- the gas, the constituents of the gas, and the concentration of the constituents at entry to the nozzle assembly 12;
- thermal expansion of components of the nozzle assembly 12; and
- the flow rate, pressure and temperature of the gas at entry to the nozzle assembly 12.

In some systems, some of the system characteristics may be adjusted, such as by adjusting, removing, or adding upstream dampers, flow controllers, pumps, etc., or by introducing other constituents to the gas, such as water vapor.

In one embodiment, computational fluid dynamics (CFD) software may be employed to resolve the structural and system characteristics. Although there may be a wide range of solutions for any given system, it is contemplated that the target condensation band B will be radially adjacent the liner 18. In this way, corrosion to the nozzle assembly 12 will be minimized. In one embodiment, the location and/or size (e.g., length in the longitudinal direction 10) of the target condensation band B may be a defined input to the CFD software and the software may assist in ascertaining structural and system values so that the system, lid assembly 1, and nozzle assembly 12 may be manufactured accordingly.

Figure 12:
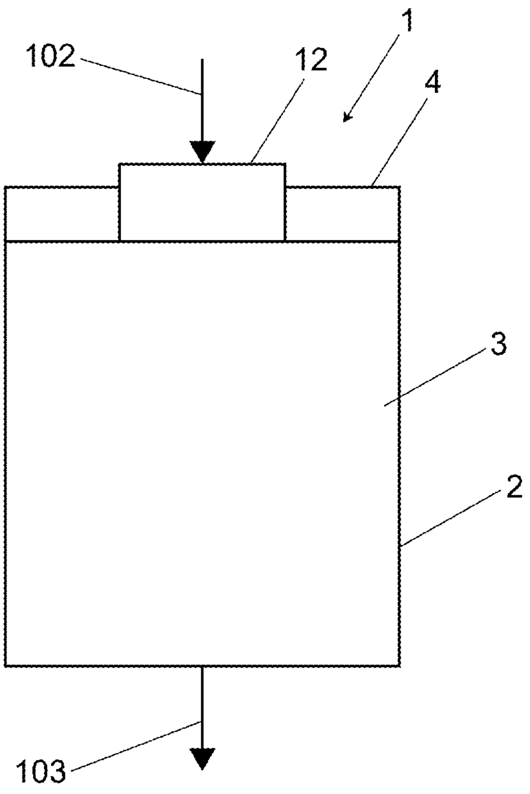
FIG. 12 is a schematic diagram of a cooler having the lid assembly according to aspects of the present disclosure.

With additional reference to FIG. 12, the gas cooler 2 may be an adiabatic gas cooler. In one embodiment, heat does not enter or leave the cooler 2. A process stream 102 enters the gas cooler 2 via the lid assembly 1, more particularly via the nozzle assembly 12. The process stream 102 is gas at a high temperature and high pressure. The gas may contain an acid-forming constituent or an acidic constituents. A process stream 103 exits the gas cooler 100. The process stream 103 is gas or liquid that has a lower temperature and a lower pressure than process stream 102, and may contain acidic constituents.

Although certain embodiments have been shown and described, it is understood that equivalents and modifications falling within the scope of the appended claims will occur to others who are skilled in the art upon the reading and understanding of this specification.

The invention claimed is:

1. A nozzle assembly for a lid of a gas cooler, the lid having a passage in which the nozzle is mounted and through which heated gas containing acidic or acid-forming constituents flows, the nozzle comprising:

- a liner, the liner having an upper end and a lower end, and made from material that is corrosion resistant to a condensate of the heated gas; and
- a deflector upstream of the liner that reduces a cross-sectional area of the passage to increase a concentration of the acidic or acid-forming constituents at the liner so that, under cooling of the heated gas as the heated gas passes the liner, the heated gas condenses adjacent the liner in a band between the upper and lower ends; and
- wherein the deflector has an inclined angle relative to a longitudinal axis of the nozzle, the inclined angle and a size of the deflector are selected to increase a velocity of the heated gas that, combined with the cooling of the gas, causes the gas to condense in the band.

2. The nozzle assembly of claim 1, wherein the condensate of the heated gas comprises at least one of sulfurous acid or sulfuric acid.

3. The nozzle assembly of claim 1, wherein the deflector comprises an upper deflector and a lower deflector, each of the upper deflector and lower deflector having a respective inclined angle relative to a longitudinal axis of the nozzle and a size to control a location of the band relative to the upper and lower ends of the liner.

4. The nozzle assembly of claim 3, wherein the inclined angle of the lower deflector is a range from about 30 degrees to about 60 degrees.

5. The nozzle assembly of claim 3, wherein the inclined angle of the upper deflector is in a range from about 30 degrees to about 60 degrees.

6. The nozzle assembly of claim 1, wherein the deflector comprises a metal alloy, the metal alloy being less resistant to corrosion from the condensate of the heated gas than the liner.

7. The nozzle assembly of claim 1, wherein the liner comprises silicon carbide.

8. The nozzle assembly of claim 1, wherein the liner comprises a plurality of liner segments that combine to encircle the flow of the heated gas.

9. The nozzle assembly of claim 8, wherein edges of adjacent liner segments have radially overlapping features that reduce flow of the heated gas radially through the liner.

10. The nozzle assembly of claim 1, wherein the gas cooler introduces cooling fluid at one or more introduction points that are radially outward from the liner, and the nozzle assembly further comprises an insulator disposed between the one or more introduction points and the liner, the insulator longitudinally overlapping a portion of the liner between the upper end and the lower end above the band at which the gas condenses.

11. The nozzle assembly of claim 10, wherein the insulator longitudinally overlaps at least a portion of the deflector between the deflector and the one or more introduction points.

12. The nozzle assembly of claim 10, further comprising an insulator housing in which the insulator is disposed.

13. The nozzle assembly of claim 12, wherein the insulator housing forms at least a portion of the deflector.

14. The nozzle assembly of claim 10, wherein a spray nozzle at each introduction point dispenses the cooling fluid.

15. The nozzle assembly of claim 1, wherein the gas cooler introduces cooling fluid at one or more introduction points that are radially outward from the liner.

16. The nozzle assembly of claim 15, wherein the cooling fluid is liquid water.

17. The nozzle assembly of claim 1, further comprising a mounting bracket that exerts a radially outward clamping pressure on the liner to secure the liner.

18. The nozzle assembly of claim 1, wherein a lower end of the deflector is located upstream and above the band so that the heated gas makes direct contact with the liner at least in the band.

19. A nozzle assembly for a lid of a gas cooler, the lid having a passage in which the nozzle is mounted and through which heated gas containing acidic or acid-forming constituents flows, the nozzle comprising:

a liner, the liner having an upper end and a lower end, and made from material that is corrosion resistant to a condensate of the heated gas, wherein under cooling of the heated gas as the heated gas passes the liner, the heated gas condenses adjacent the liner in a band between the upper and lower ends;

wherein the liner is comprised of a plurality of liner segments that combine to encircle the flow of the heated gas.

20. The nozzle assembly of claim 19, wherein edges of adjacent liner segments have radially overlapping features that reduce flow of the heated gas radially through the liner.

21. A nozzle assembly for a lid of a gas cooler, the lid having a passage in which the nozzle is mounted and through which heated gas containing acidic or acid-forming constituents flows, the nozzle comprising:

a liner, the liner having an upper end and a lower end, and made from material that is corrosion resistant to a condensate of the heated gas; and a deflector upstream of the liner that reduces a cross-sectional area of the passage to increase a concentration of the acidic or acid-forming constituents at the liner so that, under cooling of the heated gas as the heated gas passes the liner, the heated gas condenses adjacent the liner in a band between the upper and lower ends;

wherein the gas cooler introduces cooling fluid at one or more introduction points that are radially outward from the liner.

22. The nozzle assembly of claim 21, wherein the cooling fluid is liquid water.

23. The nozzle assembly of claim 21, wherein the nozzle assembly further comprises an insulator disposed between the one or more introduction points and the liner, the insulator longitudinally overlapping a portion of the liner between the upper end and the lower end above the band at which the gas condenses.

24. The nozzle assembly of claim 23, wherein the insulator longitudinally overlaps at least a portion of the deflector between the deflector and the one or more introduction points.

25. The nozzle assembly of claim 23, further comprising an insulator housing in which the insulator is disposed.

26. The nozzle assembly of claim 25, wherein the insulator housing forms at least a portion of the deflector.

27. The nozzle assembly of claim 23, wherein a spray nozzle at each introduction point dispenses the cooling fluid.

28. The nozzle assembly of claim 21, wherein a lower end of the deflector is located upstream and above the band so that the heated gas makes direct contact with the liner at least in the band.

* * * * *